April 18, 1933.　　　P. G. PALMGREN　　　1,904,247
BEARING MOUNTING
Filed Nov. 26, 1929　　　5 Sheets-Sheet 1
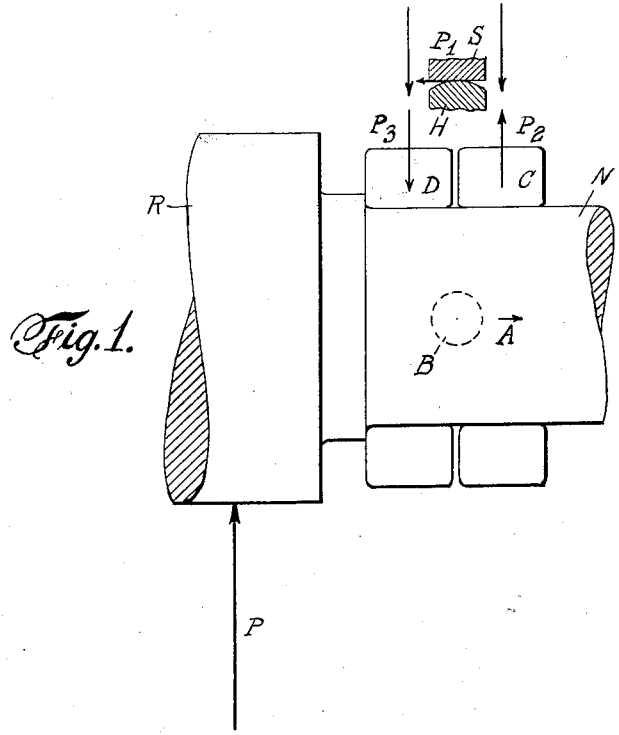
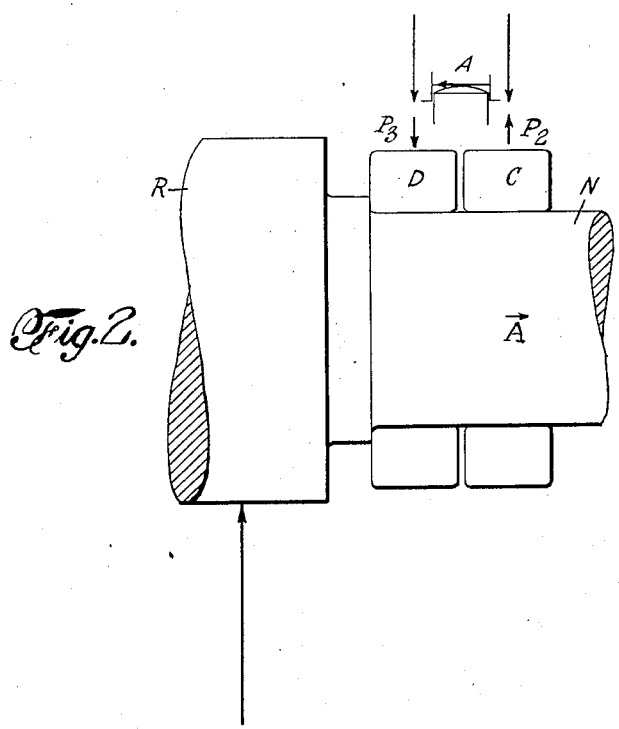
INVENTOR
PER GUNNAR PALMGREN
BY
ATTORNEY

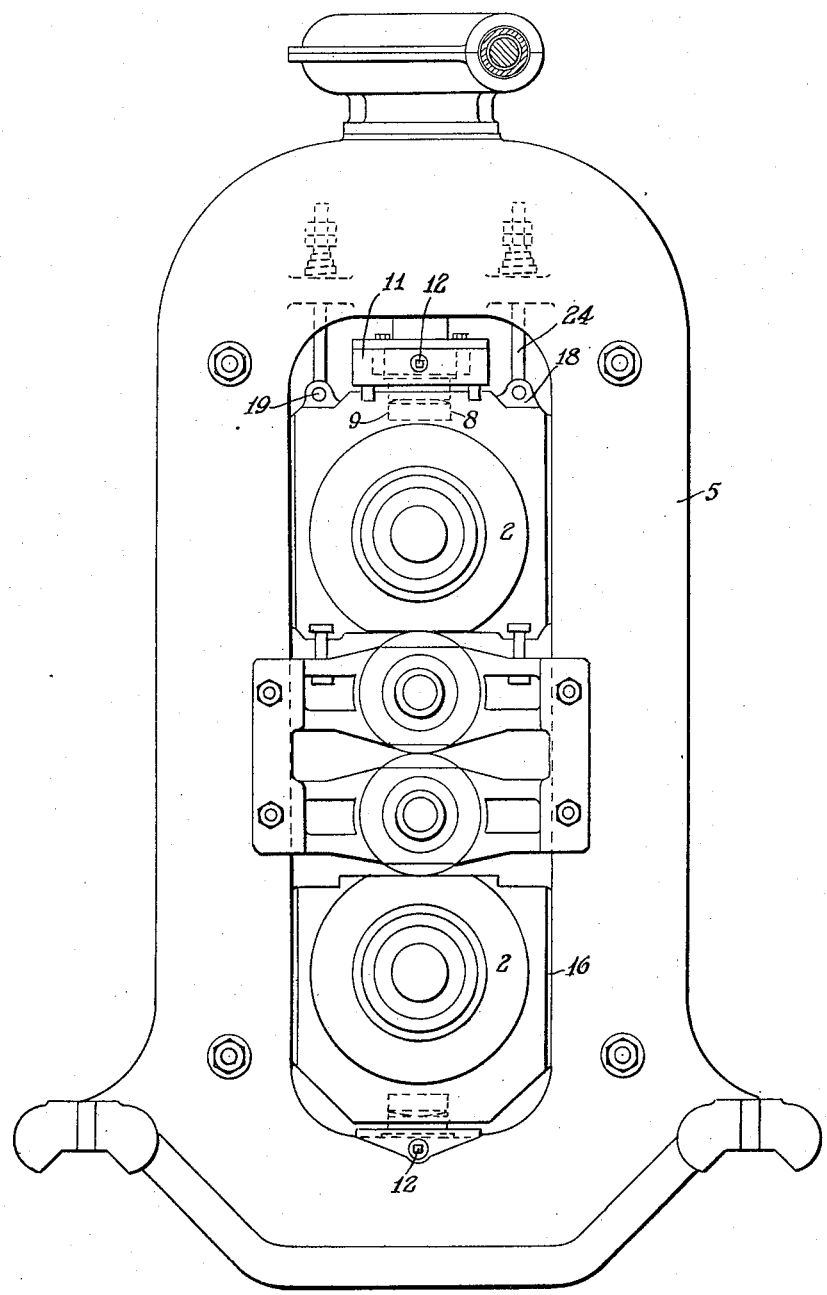

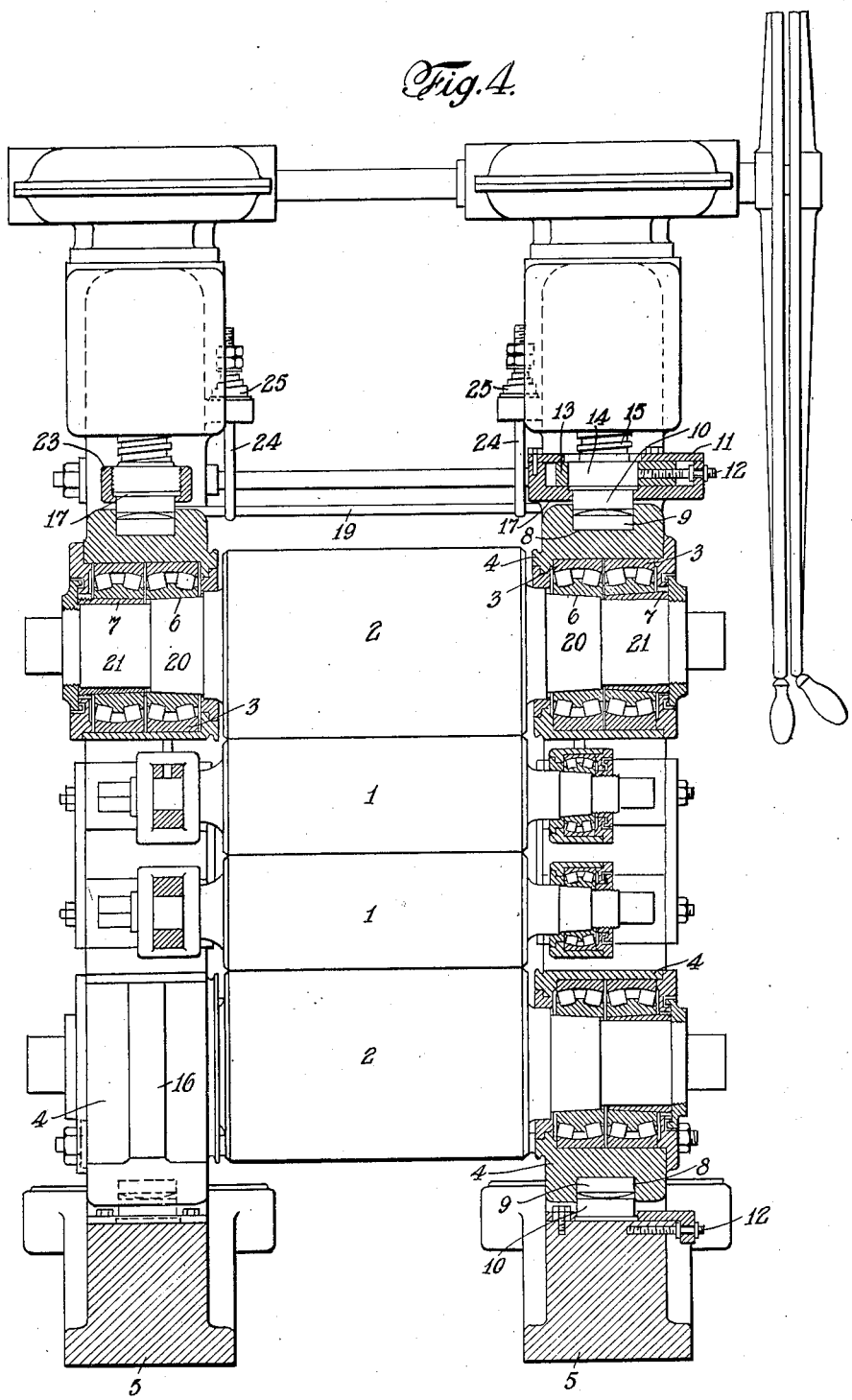

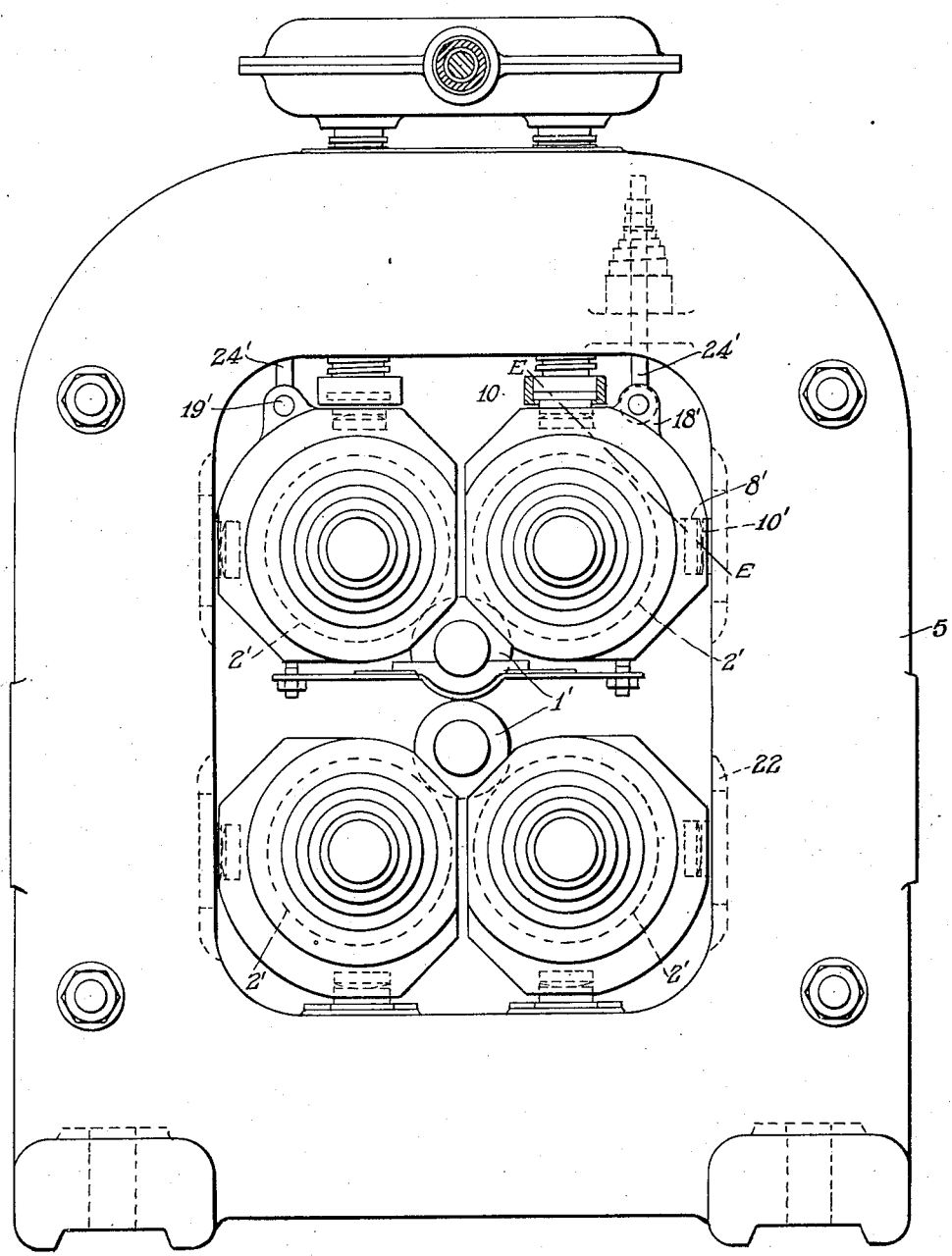

April 18, 1933.   P. G. PALMGREN   1,904,247
BEARING MOUNTING
Filed Nov. 26, 1929   5 Sheets-Sheet 5

INVENTOR
PER GUNNAR PALMGREN
BY
his ATTORNEY

Patented Apr. 18, 1933

1,904,247

UNITED STATES PATENT OFFICE

PER GUNNAR PALMGREN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN

BEARING MOUNTING

Application filed November 26, 1929, Serial No. 409,788, and in Germany May 28, 1929.

This invention relates to the mounting of bearings for carrying both radial and thrust loads and is particularly applicable to antifriction bearings arranged in pairs in bearing housings.

In heavy duty machinery, including rolling mills and cement mills in which the load on the bearings is very considerable, it is often difficult to apply antifriction bearings of a sufficient capacity because of the limited space available for such bearings. In rolling mills the roll diameter is thus usually relatively small and the diameter of the roll necks comparatively large in order to enable them to withstand the great pressures to which they are subjected. The radial space available for the bearings is thus very limited. This necessitates the use of bearings with a low and wide section, which in the case of antifriction bearings meets with considerable difficulty due to the difficulty in equally distributing the pressure in the bearing or bearings, especially when the bearings are under load and the journals are subjected to bending stresses.

It has been proposed to mount the bearing housings in spherical seats or on steel edges or on an element having a convex surface and bearing on a plane surface. In each of the above mentioned cases it has been found difficult to take care of the thrust forces always present to a greater or less degree. Unless a complicated arrangement for neutralizing the thrust was provided in these designs the bearing was subjected to a considerable overload.

In order that the invention may be more fully understood it is here described as applied to four-high and cluster rolling mills, an example of each of which is illustrated in the accompanying drawings, in which drawings Figure 1 is in the nature of a diagram for illustrating the lines of force arising upon the bending of the roll necks in certain mountings of well known design.

Fig. 2 is a similar diagram illustrating the lines of force arising upon the bending of the roll necks when mounted in accordance with my present invention.

Fig. 3 is a side view of a four-high rolling mill.

Fig. 4 is a face view (partly in longitudinal section) of the same rolling mill.

Fig. 5 is a side view of a cluster rolling mill, and

Figure 6:
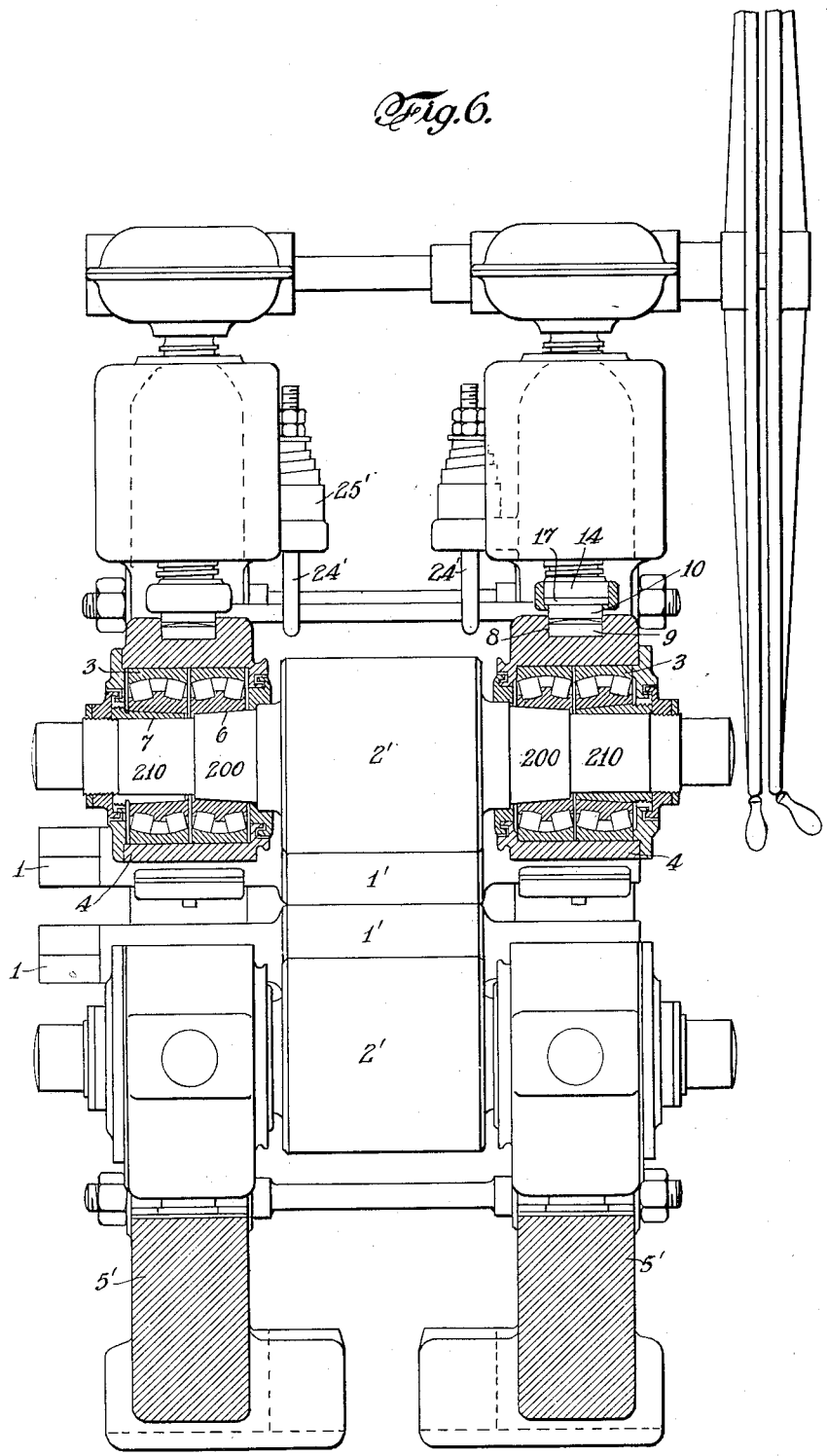
Fig. 6 is a face view of the same rolling mill partly in section.

The forces acting on the bearings, for a roll R, mounted in a housing supported on a convex surface in a known manner are shown in the accompanying diagram, Figure 1. The housing is assumed to be fixed axially in the usual manner by means of a pin B about which it can rotate to accommodate the bending of the roll neck N. This gives rise to a sliding movement between the heavily loaded convex surface carried by the bearing housing H and plane surface formed on the stand S. The force $P_1$ arising from the friction between these surfaces gives rise to forces $P_2$ and $P_3$ working on the bearings. The force $P_2$ lessens the load on bearing C, while the force $P_3$ increases the load on bearing D. It will thus be seen that the bearing D besides receiving its share of the radial load P is also subjected to the force $P_3$ arising from friction. Since the force $P_1$ is considerable, the force $P_3$ considerably increases the load on the bearing D.

According to the present invention the bearing housing is free to roll on the convex surface of a hardened steel element recessed in the housing and bearing against another hardened steel element with plane surface fixed to the stand or end frame of the rolling mill. Instead of being fixed axially at its centre line as has hitherto been the custom the housing is fixed as near as possible to the rolling surface to ensure a rolling motion with a minimum of sliding.

The forces acting on bearings mounted in this manner are shown in diagram Fig. 2. The force A is considerably less than the force $P_1$ in Figure 1. As a result the force $P_3$ will be less and the load will be more evenly divided on bearings C and D.

Even in this case a slight sliding movement takes place, when the rolls adjust themselves to the bending forces. This movement is in all cases less than in the type of mounting illustrated in Figure 1 and will be less the more nearly the mounting conforms to the ideal mounting in which the radial load and the thrust load are taken up at the same point.

To enable the rolls to be adjusted axially and to accommodate the bending of the roll necks the bearings on one side of the rolls are mounted slidably in the housings. Any sliding that takes place occurs between well lubricated and carefully ground surfaces of comparatively large area and the friction is therefore inconsiderable. Furthermore the outer races of the bearings rotate slowly in relation to the housing, which greatly facilitates their axial displacement.

The working rolls 1 bear in the usual manner against supporting rolls 2. The neck portions 20—21 of the latter are mounted on bearings 3—3 in housings 4 in the stands or end frames 5. In the illustration the bearings are shown as of the self-aligning roller type, and mounted in pairs at each end of the rolls 2. The innermost bearings are mounted directly on conical seatings 6 on the roll neck portions 20. The outermost bearings are mounted on the neck portions 21 by means of withdrawal sleeves 7. This arrangement of the bearings permits of the application of bearings of sufficient capacity, at the same time giving the roll necks the form most suitable to withstand the bending stresses.

The housings 4 are provided with recesses 8, which form seats for the hardened steel discs 9. The discs have a convex surface of comparatively great radius and bear with their convex surfaces against the plane surfaces of other hardened steel discs 10 which project into the recesses 8. This construction permits the housing to roll on the surface of the discs 10, while being fixed axially. If so desired, the disc 8 may instead project into the stand 5 or the slide 11, as suggested in the diagram of Fig. 2.

For axial adjustment of the upper supporting roll the disc 10 at one end is shown fixed in a slide 11. A screw 12 engages a collar 13 encircling the head 14 of the adjusting screw 15. By turning the screw 12 the slide is moved axially of the rolls in relation to the collar 13 taking with it the disc 10, the housing 4 and the roll 2. The adjustment of the lower supporting roll may be effected in a similar manner with the exception that the disc 10 may rest directly on the stand and that the screw 12 engages the stand instead of a collar.

The housings 4 are fixed in axial position by the discs 10, which as mentioned above project into the recesses 8 formed in the housings. To prevent the bearings being damaged by the excessive thrust occasioned by roller breakage, the discs 10 are held in the slide 11 on the floating side and in the collar 23 on the stabilized side only by means of a small flange 17. The parts are dimensioned so that the discs 10 will be torn from their settings and the housings freed before the thrust becomes sufficiently great to injure the bearings.

The bearing housing is provided with a raised portion 16 engaging the stand 5 and which guides the housing in transverse direction, while allowing the disc 9 to roll freely on the disc 10.

The upper bearing housings are each illustrated as hung on two lugs 18 located at front and rear. Cross bars 19 are shown passing respectively through the front lugs of both housings and the rear lugs. The cross bars are each shown supported by hangers 24 carried by springs 25 resting on the stands or end frames 5.

It will be seen that the construction is very simple and that only the recesses 8 in the bearing housings and the recesses 22 in the stands need be machined.

The application of the invention to cluster mills is illustrated in Figs. 5 and 6. In this case each bearing housing is provided with two recesses 8—8' in which are set discs 9—9', the recesses being in engagement with discs 10—10' as before described. One of the recesses, 8, in each bearing housing is located as for four-high mills the other, 8', being located at the side of the bearing housing turned toward the end frame. The upper bearing housings are hung on lugs 18' through which a cross bar 19' is passed. The cross bar 19' is supported by hangers 24' carried by springs 25' resting on the stands or end frames 5'. If the lugs 18' are located between the discs 9—9' as shown in Fig. 5 only one lug will be required for each upper supporting roll bearing housing and the housings will be held in proper position bearing against both discs 10. No lugs etc. are required for the lower bearing housings or the weight of the supporting rolls, and the lower working roll will be sufficient to hold them in proper position, when running idle. The pressure from the working roll will keep the supporting rolls firmly pressed against the sides of the stands, when material is being rolled.

When the roll necks bend under the load the bearing housing will turn about an axis E—E passing through the contacting surfaces of the discs. This takes place under a slight sliding movement between the discs. The effect on the bearings of the resistance to the turning caused hereby is, however, so slight as to be of no consequence.

While the invention is above described in connection with rolling mills, it will be understood that it may also be applied to other machines in which the bearings are required to carry a heavy radial load at the same time being subjected to considerable thrust. And it will also be apparent that changes may be made as required within the scope of the claims without departing from the spirit of my invention.

Having described my invention, I claim and desire to secure by Letters Patent:

1. A bearing mounting comprising a housing and a support therefor, one of these members being formed with a recess having a bottom face, a hardened member projecting into such recess and having a face engaging such bottom face, one of such faces being plane and the other being convex, the faces being in rolling engagement and adapted to transmit radial load, and the side face of the projecting member engaging the wall of the recess for transmitting thrust loads.

2. A bearing mounting for carrying radial and thrust loads comprising a bearing housing and a support therefor, one of these members being formed with a recess having a bottom face and a hardened member projecting into such recess and having a face engaging such bottom face, one of such faces being plane and the other being convex, the faces being in rolling engagement and adapted to transmit radial load, the side faces of the projecting member being adapted to engage the side walls of the recess for transmitting thrust, the projecting member being designed to be torn from its setting by a predetermined thrust force.

3. An antifriction bearing mounting for rolling mill rolls for carrying radial and thrust loads, comprising a rolling mill frame, a support fixed to such frame and having a radial load carrying face, a bearing housing having a face in rolling engagement with the said load carrying face and adapted to transmit radial load at the point of said rolling engagement, there being thrust resisting faces on the support and also thrust transmitting faces on the housing adapted to engage the said thrust resisting faces on the support when the housing is subjected to thrust, the said point of rolling engagement and the thrust resisting faces being located at a less distance apart than the distance the radial load carrying face is located from the axis of the roll neck.

4. The combination with an anti-friction bearing provided with a plurality of rows of rolling elements having a common axis of revolution, a housing for such bearing, the housing being formed with a recess extending inwardly from its exterior radially of said axis of revolution, such recess being located in a plane perpendicular to the said axis of rotation and dividing the number of rows of rolling elements symmetrically, and a frame structure; of two members, one of these having a convex face and being located in the said radially disposed recess, the second member having a plane face and being attached to the frame structure loosely fitting in the recess and contacting the convex face of member number one, thereby providing for the transmission of radial loads from the bearing housing to the frame structure and permitting the bearing housing to tilt upon such contacting faces free from sliding, there being a thrust resisting face on member number two and also a thrust transmitting face on the bearing housing in said recess adapted to engage when the bearing housing is subjected to thrust.

PER GUNNAR PALMGREN.